United States Patent
Arkharov et al.

(10) Patent No.: US 12,130,837 B1
(45) Date of Patent: Oct. 29, 2024

(54) SYNCHRONOUS BLOCK LEVEL REPLICATION ACROSS AVAILABILITY ZONES

(71) Applicant: Google LLC, Mountain View, CA (US)

(72) Inventors: Andrey Arkharov, Kirkland, WA (US);
Andrei Burago, Kirkland, WA (US);
Jonathan Forbes, Bellevue, WA (US);
Anton Sukhanov, Bellevue, WA (US);
Fabricio Voznika, Kenmore, WA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/521,240

(22) Filed: Nov. 28, 2023

Related U.S. Application Data

(63) Continuation of application No. 17/551,914, filed on Dec. 15, 2021, now Pat. No. 11,841,734, which is a continuation of application No. 15/893,262, filed on Feb. 9, 2018, now Pat. No. 11,232,131.

(51) Int. Cl.
*G06F 16/10* (2019.01)
*G06F 9/455* (2018.01)
*G06F 16/178* (2019.01)
*G06F 16/27* (2019.01)

(52) U.S. Cl.
CPC ........ *G06F 16/275* (2019.01); *G06F 9/45558* (2013.01); *G06F 16/178* (2019.01); *G06F 2009/45583* (2013.01); *G06F 2009/45595* (2013.01)

(58) Field of Classification Search
CPC .................................................. G06F 16/178
See application file for complete search history.

(56) References Cited

U.S. PATENT DOCUMENTS

| | | | |
|---|---|---|---|
| 6,662,198 | B2 | 12/2003 | Satyanarayanan et al. |
| 8,041,818 | B2 | 10/2011 | Gupta et al. |
| 8,074,107 | B2 | 12/2011 | Sivasubramanian et al. |
| 8,838,539 | B1 | 9/2014 | Ashcraft et al. |
| 10,360,057 | B1 | 7/2019 | Vashishtha et al. |
| 2006/0253504 | A1 | 11/2006 | Lee et al. |
| 2012/0254116 | A1 | 10/2012 | Thereska et al. |
| 2015/0113324 | A1 | 4/2015 | Factor et al. |

(Continued)

OTHER PUBLICATIONS

Zhuan Chen et al., Replication-based Highly Available Metadata Management for Cluster File Systems, ICT, Cluster 2010, Heraklion, Creece, Sep. 23, 2010, 34 pages.

(Continued)

*Primary Examiner* — Kristopher Andersen
(74) *Attorney, Agent, or Firm* — Lerner David LLP

(57) ABSTRACT

A replicated block storage service provides durable and high performance network-attached storage replicated in two or more zones of a single region, and remains available despite a single zone failure. A probe file is generated to determine a health state of a replicated disk. When a disk is degraded, a lease is created indicating which replica is trusted and providing visibility to backend jobs to facilitate reconciliation of data between the first replica and the second replica. Moreover, degraded file markers are generated for use by the backend jobs in quickly identifying the data to be copied.

18 Claims, 11 Drawing Sheets

(56) References Cited

U.S. PATENT DOCUMENTS

2017/0161160 A1    6/2017   Helmick et al.
2017/0249334 A1*  8/2017   Karampuri .............. G06F 16/11

OTHER PUBLICATIONS

Mike Burrows, The Chubby lock service for loosely-coupled distributed systems, OSDI '06 Paper, Sep. 6, 2006, 22 pages.

Yang Wang et al., Gnothi: Separating Data and Metadata for Efficient andAvailable Storage Replication, The University of Texas at Austin, USENIX ATC 2012, 12 pages.

Proceedings of the 13th USENIX Conference on File and Storage Technologies (FAST '15), Feb. 16-19, 2015, Santa Clara, CA, 397 pages.

Sanjay Ghemawat et al., The Google File System, SOSP'03, Oct. 19-22, 2003, Bolton Landing, New York, pp. 29-43.

Dbvisit, "Physical Or Logical Replication? | The Smart Alternative—Dbvisit" http://www.dbvisit.com/physical-vs-logical-replication/ (2015) 2 pgs.

* cited by examiner

| Zone A-2 (Unhealthy) | Zone A-4 (Healthy) |
|---|---|
| Write to 1.log | Write to 1.log |
| Error/Failure | |
| Close 1.log | Close 1.log |
| | Open new file 2.log |
| | Open new degraded_marker_2.log |

Fig. 7

| | Device is writing in | Lease ? | Trust which cell? |
|---|---|---|---|
| 810 Fully replicated | 2.2 | No | Any |
| 820 Degraded mode | 1.1 or 2.2 | Yes, not expired | Trusted |
| 830 Catching up | 2.2 | Yes, expired | Trusted |

SYNCHRONOUS BLOCK LEVEL REPLICATION ACROSS AVAILABILITY ZONES

CROSS-REFERENCE TO RELATED APPLICATIONS

The present application is a continuation of U.S. Patent Application No. 17,551,914, filed Dec. 15, 2021, which is a continuation of U.S. patent application Ser. No. 15/893,262, filed Feb. 9, 2018, the disclosures of which are hereby incorporated herein by reference.

BACKGROUND

Current block storage services provide durable and high performance network-attached storage. Such storage services can be accessed via a client-side library. Resources of the block storage service live in regions or zones. A region is a specific geographical location in which resources can be run. Each region has one or more zones. Zones have high-bandwidth, low-latency network connections to other zones in the same region. Resources that live in a zone, such as disks and instances, are referred to as zonal resources. To attach a disk to an instance, both resources must be in the same zone. Similarly, to assign a static Internet protocol (IP) address to an instance, the instance must be in the same region as the static IP. Regional resources, on the other hand, can be used by any resources in that particular region, regardless of zone.

A disk replicates data within a single zone specified by a user, so if a zone becomes unavailable, then user data becomes unavailable as well. Zone unavailability may be caused by any of a number of issues, such as power outages, floods, machine level failures, etc. Zone unavailability presents significant problems for users, for example, by making the user data inaccessible for periods of time which are sometimes prolonged. This can result in downed websites, lost business, etc.

Current block storage services may not, in some instances, prevent multiple writers from accessing and potentially unrecoverably corrupting a disk volume. In some instances, two virtual machines can potentially freely write to different segments of a disk volume, or even the same segment. In other examples, a network partition causes a duplicate job to be created. Such access from multiple writers effectively corrupts the disk volume.

BRIEF SUMMARY

The present technology guards against zone unavailability in block storage devices. This may be particularly important for systems with higher availability requirements. The block storage system includes synchronous replication of data across two user specified zones within a single region.

One aspect of the disclosure provides a method for maintaining a replicated disk in a distributed storage system. The method includes maintaining, in one or more memories in a first zone of the distributed storage system, a first replica including a first copy of disk data, and maintaining, in the one or more memories in a second zone of the distributed storage system, a second replica including a second copy of the disk data. The method further includes attempting, by a first virtual machine attached to the replicated disk, a write command to a specified file in both the first replica and the second replica, and determining, based on a result of the attempted write command, a health state of the disk. When the determined health state of the disk indicates that the first replica is unhealthy, the method further includes closing the specified file in both replicas, creating a new file corresponding to the specified file in the second replica, and creating a degraded file corresponding to the specified file in the second replica, the degraded file being marked as degraded.

According to some examples, the method may further include copying, by one or more backend processors, data from the second replica to the first replica. The method may yet further include scanning, by the one or more backend processors, the data in the second replica for files marked as degraded, wherein the copying from the second replica to the first replica is limited to the files marked as degraded identified during scanning.

According to some examples, the attempted write command includes a probe file generated for testing the health state of the disk. In other examples, the attempted write command includes a write command generated by a client device.

According to some examples, the method may further include attaching the replicated disk to a second virtual machine while the replicated disk is accessible to the first virtual machine, and preventing the first virtual machine from creating new read-write files.

The health state of the disk may be variable between a fully replicated state, a degraded state, and a partially replicated state. In the fully replicated state both replicas are healthy. In the degraded state the first replica is unhealthy and the second replica is trusted. In the partially replicated state, the first replica has been restored to health from the degraded state, but is missing data as compared to the second replica. A replication lease may be created for the degraded state, wherein the replication lease is allowed to expire once the disk enters the partially replicated state. Expiration of the replication lease indicates to one or more backend processors to begin copying the data from the second replica to the first replica, and wherein the one or more backend processors delete the expired replication lease when copying is complete. The replication lease may further indicate which replica is degraded and which replica is trusted.

Another aspect of the disclosure provides a system for maintaining a replicated disk in a distributed storage system. The system includes one or more memories in a first zone of the distributed storage system, the one or more memories in the first zone storing a first replica including a first copy of disk data, and one or more memories in a second zone of the distributed storage system, the one or more memories in the first zone storing a second replica including a second copy of the disk data. The system may further include one or more processors in communication with at least one of the first replica or the second replica, the one or more processors configured to attempt a write command to a specified file in both the first replica and the second replica, determine, based on a result of the attempted write command, a health state of the disk, and when the determined health state of the disk indicates that the first replica is unhealthy, close the specified file in both replicas, create a new file corresponding to the specified file in the second replica, and create a degraded file corresponding to the specified file in the second replica, the degraded file being marked as degraded.

According to some examples, the system may further include one or more backend processors configured to copy data from the second replica to the first replica. The one or more backend processors may be further configured to scan the data in the second replica for files marked as degraded, wherein the copying from the second replica to the first replica is limited to the files marked as degraded identified during scanning.

Yet another aspect of the disclosure provides a non-transitory computer-readable medium storing instructions executable by one or more processor for performing a method of maintaining a replicated disk in a distributed storage system. The method may include maintaining a first replica including a first copy of disk data, maintaining a second replica including a second copy of the disk data, attempting a write command to a specified file in both the first replica and the second replica, determining, based on a result of the attempted write command, a health state of the disk, and when the determined health state of the disk indicates that the first replica is unhealthy, closing the specified file in both replicas, creating a new file corresponding to the specified file in the second replica, and creating a degraded file corresponding to the specified file in the second replica, the degraded file being marked as degraded.

In some implementations, a replicated block storage service provides durable and high performance network-attached storage replicated in two or more zones of a single region, and remains available despite a single zone failure. A probe file is generated to determine a health state of a replicated disk. When a disk is degraded, a lease is created indicating which replica is trusted and providing visibility to backend jobs to facilitate reconciliation of data between the first replica and the second replica. Moreover, degraded file markers are generated for use by the backend jobs in quickly identifying the data to be copied.

These and other techniques discussed in more details below allow synchronous replication across availability zones at block storage level with support for fail-over. In other words, in some implementations, there are provided replication techniques to guard against zone unavailability. According to aspects of the disclosure, there are replication techniques provided with synchronous replication of data across at least two user specified zones within a single region.

BRIEF DESCRIPTION OF THE DRAWINGS

FIG. 7 illustrates an example of degraded marker file creation according to aspects of the disclosure.

FIG. 8 is an example chart illustrating behavior of the replicated disk in different states according to aspects of the disclosure.

DETAILED DESCRIPTION

The present disclosure provides for a replicated block storage service which provides durable and high performance network-attached storage replicated in two or more zones of a single region. The replicated block storage system provides the same features and shares the same infrastructure as regular block storage systems, but remains available despite a single zone failure. The replicated block storage system stores user data in two or more cells which belong to two or more different zones of a single region, and remains available in case of an outage of a single cell.

Figure 1:
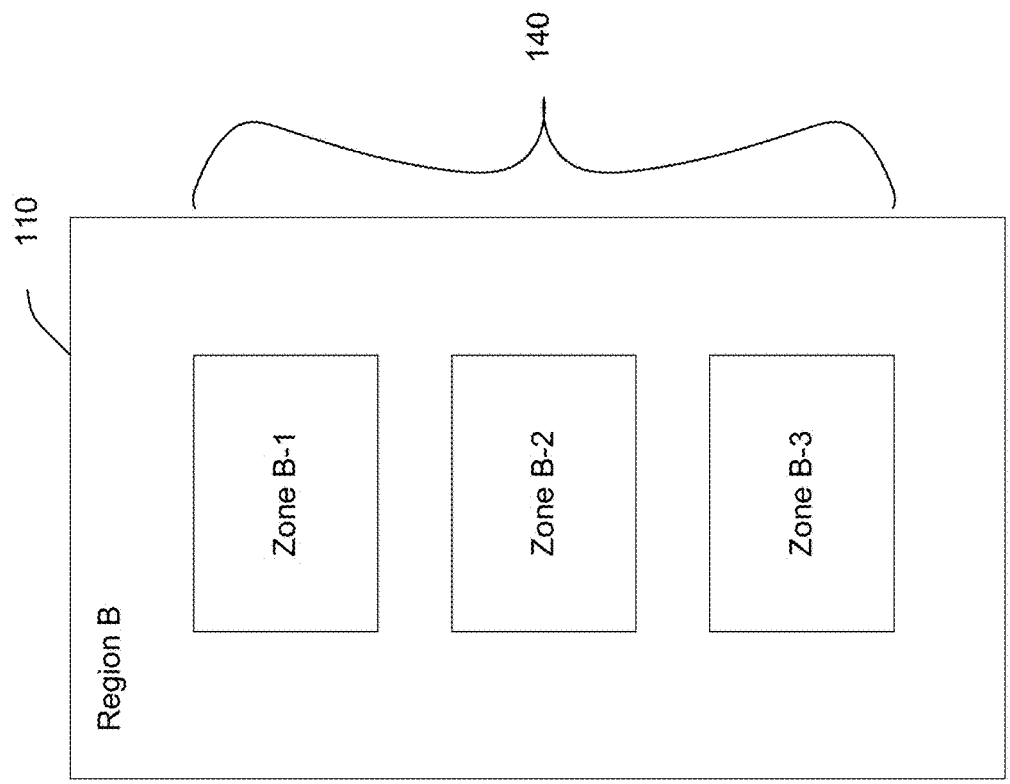
FIG. 1 is a block diagram illustrating an example disk replication system according to aspects of the disclosure.
Figure 1:
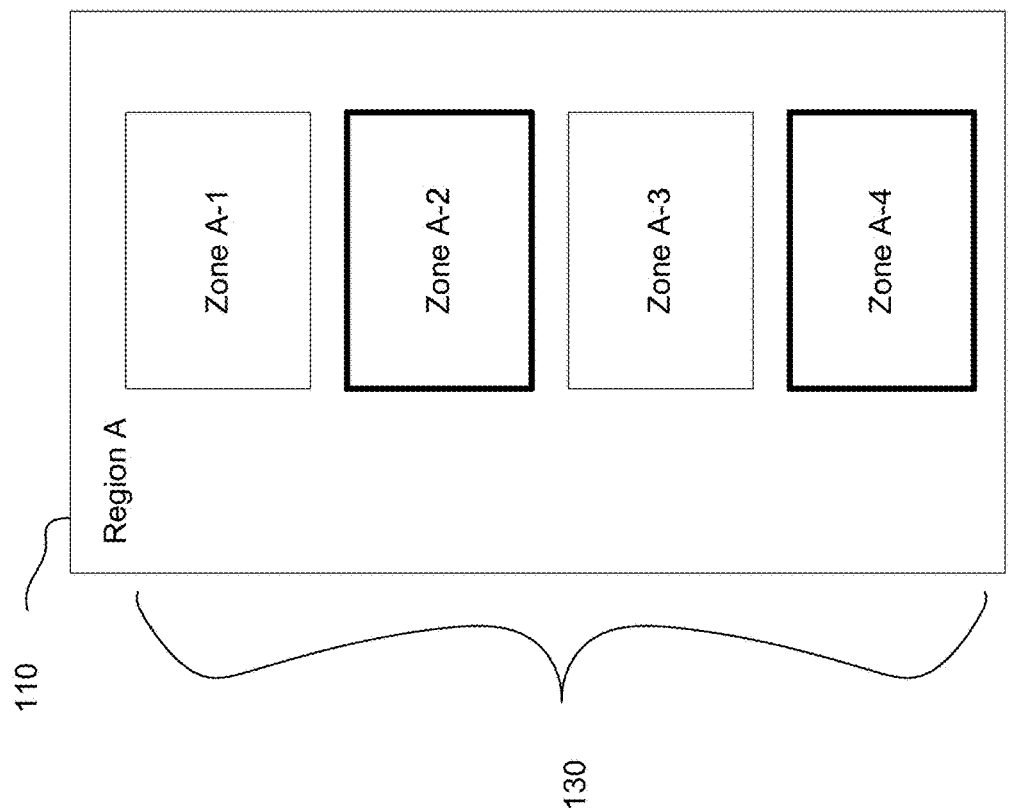

FIG. 1 illustrates an example of a storage system 100 including a plurality of regions 110 (Region A, Region B), with each region 110 having one or more zones 130, 140. The regions 110 may correspond to geographic regions, such that the zones for each respective region are positioned within the geographic area. By way of example only. Region A may be in central United States, while Region B is in Western Europe. The zones 130, 140 within each region may each include a plurality of computing resources in one datacenter or in multiple datacenters spread across the respective region.

Figure 2:
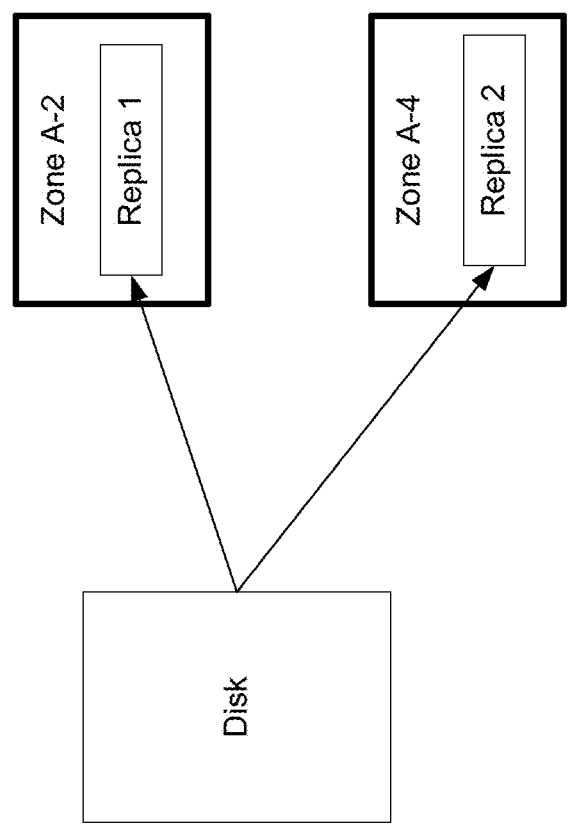
FIG. 2 is a block diagram illustrating replicated data across different zones according to aspects of the disclosure.

While in typical systems a disk is stored within a single zone, the present disclosure provides for replicating data corresponding to a disk in two or more zones. For example, as shown in FIG. 1, the same data is stored in Zone A-2 and Zone A-4. Replication may be implemented at a logical or physical level. For example, for logical replication, there may be some mapping from logical block addresses to corresponding locations on backing storage nodes. Logically, the same data is in all replicas, although a physical layout of data on storage nodes maybe different. When replication is implemented at a physical level, physical data is identical in all replicas. For example, as shown in FIG. 2, files, chunks, or other units of data may be the same on a first replica in a first zone (e.g., Zone A-2) and on a second replica in a second zone (e.g., Zone A-4). One of the advantages of replication at physical level is that reconciliation is easier to implement. For example, if lengths and checksums of the corresponding units of data match, then the replicas may be trusted.

A virtual machine may attach to a disk to use information stored in one or more of the replicas. For example, the virtual machine may receive commands from a client device or other devices to execute operations based on data stored on a replicated disk. The virtual machine may be in a same zone or a different zone as a replica to which it is attached. Prior to the virtual machine attaching to a disk, however, the replica should be trusted, such that it is properly functioning and includes accurate data. According to some examples, the virtual machine may verify that a replica is trusted prior to attachment. Examples of such verification include checking lengths and checksums of corresponding units of data as mentioned above, checking metadata, or any of a number of other techniques. According to other examples, a storage client library inside the virtual machine, or inside a host of the virtual machine, may correctly detect which replica is healthy/trusted and route requests appropriately. It should be understood that the virtual machine itself is distinct from software that the virtual machine is executing. The virtual machine software may have access to a replicated disk. For example, the virtual machine may support log files, probe files, degraded file markers, etc., as explained in further detail herein. However, the software running in the virtual machine ordinarily would not have the same access. Instead, the virtual machine is providing virtual disk functionality to the software running inside the virtual machine by implementing it on top of this replicated disk functionality.

Various types of replication are possible. For example, a number of replicas on which data is stored may be varied, and a number of replicas required to acknowledge a successful operation, such as a write operation, may also be varied. Accordingly, while some systems may implement three replicas, and require all three replicas to acknowledge a successful operation, other systems may implement three replicas but only require acknowledgement from two of the three replicas for an operation to be considered successful. Other examples may include four or five replicas. However, with four replicas there is no quorum, and five replicas becomes expensive.

Figure 3:
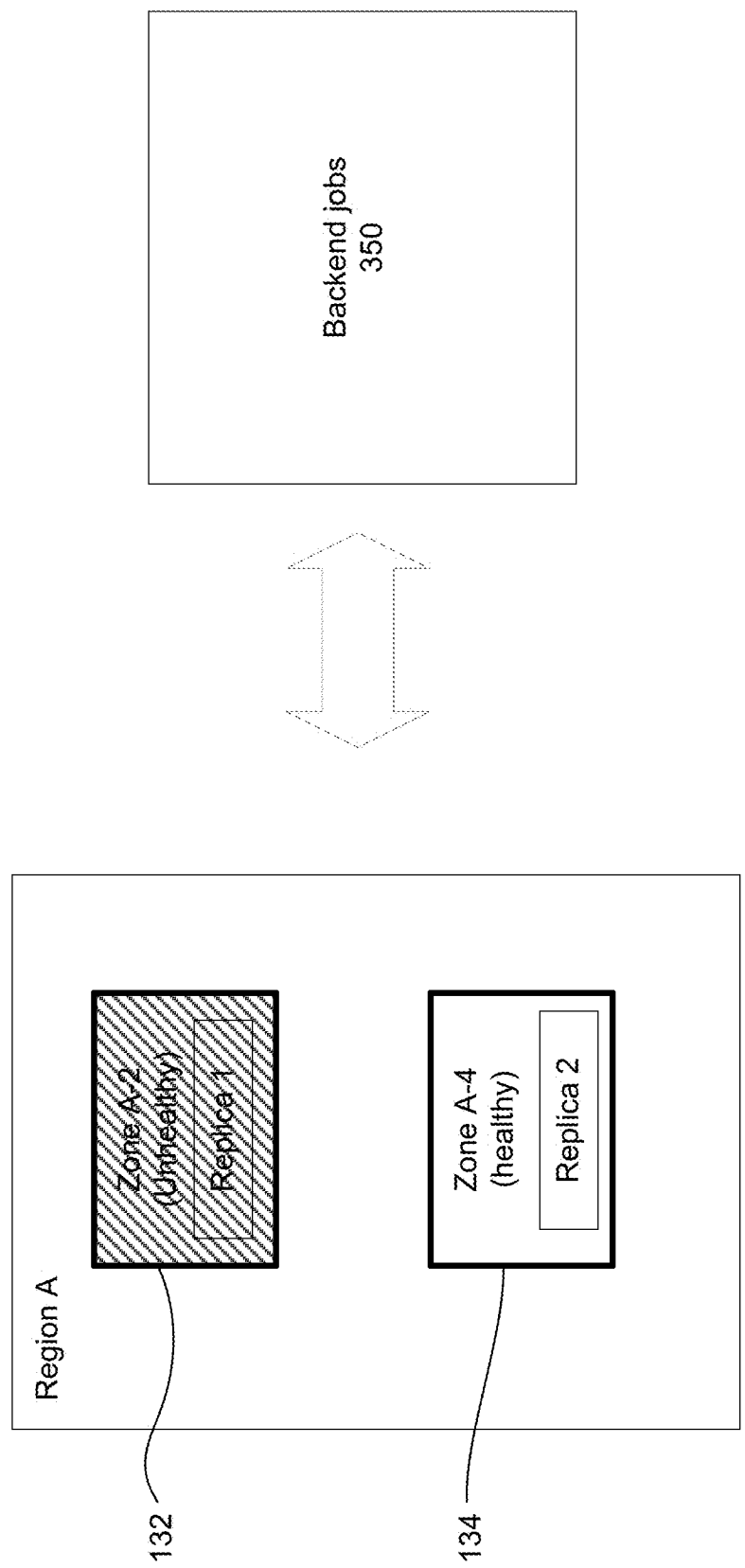
FIG. 3 is a block diagram illustrating an interface between a disk replication system and backend jobs according to aspects of the disclosure.

FIG. 3 illustrates an example where replication is performed with only two replicas 132, 134, requiring acknowledgement from both replicas 132, 134 for a successful operation. If one replica 132 is unhealthy, the other replica 134 is treated as a source of correct information.

Information regarding a health state of a replica may be maintained by one or more other devices. For example, a centralized coordination service may be used to record which replica is a trusted replica. In some examples, such as described in further detail below in connection with FIG. 6, a time lease may be used to indicate which replica is trusted.

As shown in FIG. 3, the replicas 132, 134 may also be interfaced with one or more backend jobs 350. For example, the centralized coordination service may also serve as the interface to backend jobs 350. The backend jobs 350 may perform reconciliation when one or more replicas becomes unhealthy.

The backend jobs 350 may include, for example, one or more categories of jobs performed by one or more backend computing devices. For example, the backend jobs may perform one or more of metadata management jobs, maintenance jobs, data storage jobs, etc. While in some examples particular machines may be dedicated to each different category of job, in other examples any given backend computing device may perform a variety of different jobs.

The devices performing metadata management jobs are responsible for keeping and performing operations on disk and snapshot metadata. By way of example only, the devices may create or delete a disk, take a snapshot of a disk, increase a disk size, etc. Such operations may primarily be caused by user initiated actions. In conventional systems, metadata management jobs do not interact with disk data.

The devices performing maintenance jobs may be responsible for performing regular maintenance as well as executing on user initiated operations orchestrated by management jobs. Examples of such operations include garbage collection of disk data, verifying data integrity, and uploading disk data to another storage system for snapshot purposes.

The devices performing data storage jobs may store disk data and manage storage allocation on a single physical machine.

Figure 4:
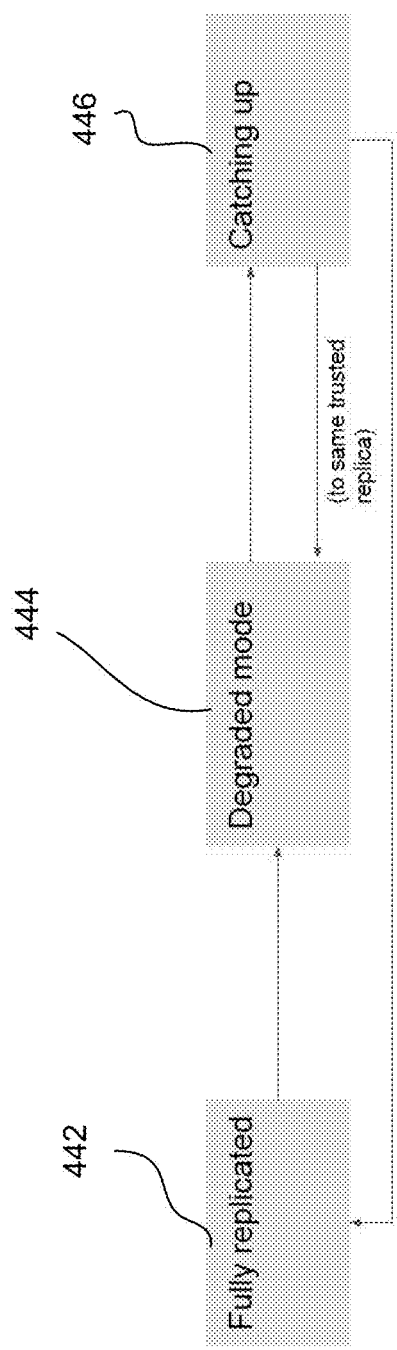
FIG. 4 is a state diagram illustrating an example transition through different state of a replicated disk.

FIG. 4 illustrates different states of a disk, such states including a fully replicated state 442, a degraded state 444, and a partially replicated or "catching up" state 446. In the fully replicated state 442, both replicas are healthy. In the degraded state 444, at least one replica is unhealthy. Accordingly, writes go only to a trusted replica. In partially replicated state 446, a replica that was previously unhealthy appears to be partially healthy again. As such, writes can be recorded in the replica again. However, the replica may not be indicated to be fully recovered, and thus may still not be regarded as trusted by a virtual machine.

A disk may transition to one of the fully replicated, degraded, or partially replicated state depending on factors such as an amount of write failures. The number of write failures that would change a replica to different state may be configurable. For example, replication may be set up such that a single write failure causes transition from a healthy to a degraded mode. In other examples, replication may be configured such that several or more write failures are tolerated before a replica is considered to be degraded.

In some examples, a probe file is periodically created on a disk to determine a health state of a replica. For example, virtual machine attached to the disk may run on a hypervisor on a host machine. A cloud specific library of the host machine, such as in the hypervisor or as a separate process on the host, may interact with data storage and other jobs. The cloud specific library may thus communicate with the replicas, via a probe file, to determine a health state of the replicas.

Figure 5:
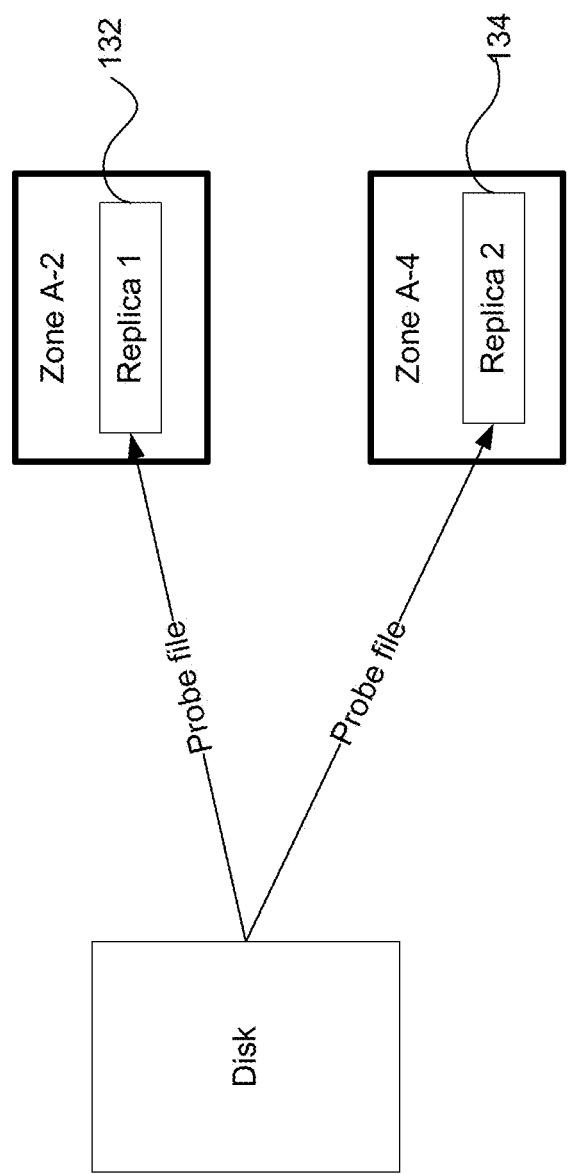
FIG. 5 is a block diagram illustrating generation of probe files according to aspects of the disclosure.

FIG. 5 illustrates an example of such probe file. The probe file may include, for example, test data which is attempted to be written to one or both of the replicas 132, 134. The attempted write may be to a log file or any other type of file in the replica. A result of the attempted write may indicate a health state of the replicas. For example, if the write was successful in both replicas 132, 134, it may be determined that the disk is in the fully replicated state. If one replica, e.g., replica 132, returns an error or failure, but the attempted write of the probe file was successful in the other replica 134, it may be determined that the disk is in a degraded state. When a disk is in the degraded state, a client library of the disk may generate one or more probes to determine whether the unhealthy replica is healthy again. If a certain number of probes is created successfully and in a timely manner, this may indicate to the disk that the unhealthy replica 132 has been restored to health. Accordingly, the disk can switch to the replicated writes mode.

As a result of the attempted write probe file, a disk or a virtual machine attached to the disk may create or extend a replication lease, or allow the replication lease to expire. The lease may be created, for example, when the disk is determined to be in the degraded mode, and may extend until the disk again becomes fully replicated. Information regarding the lease may be maintained, for example, by the centralized coordination service.

Figure 6:
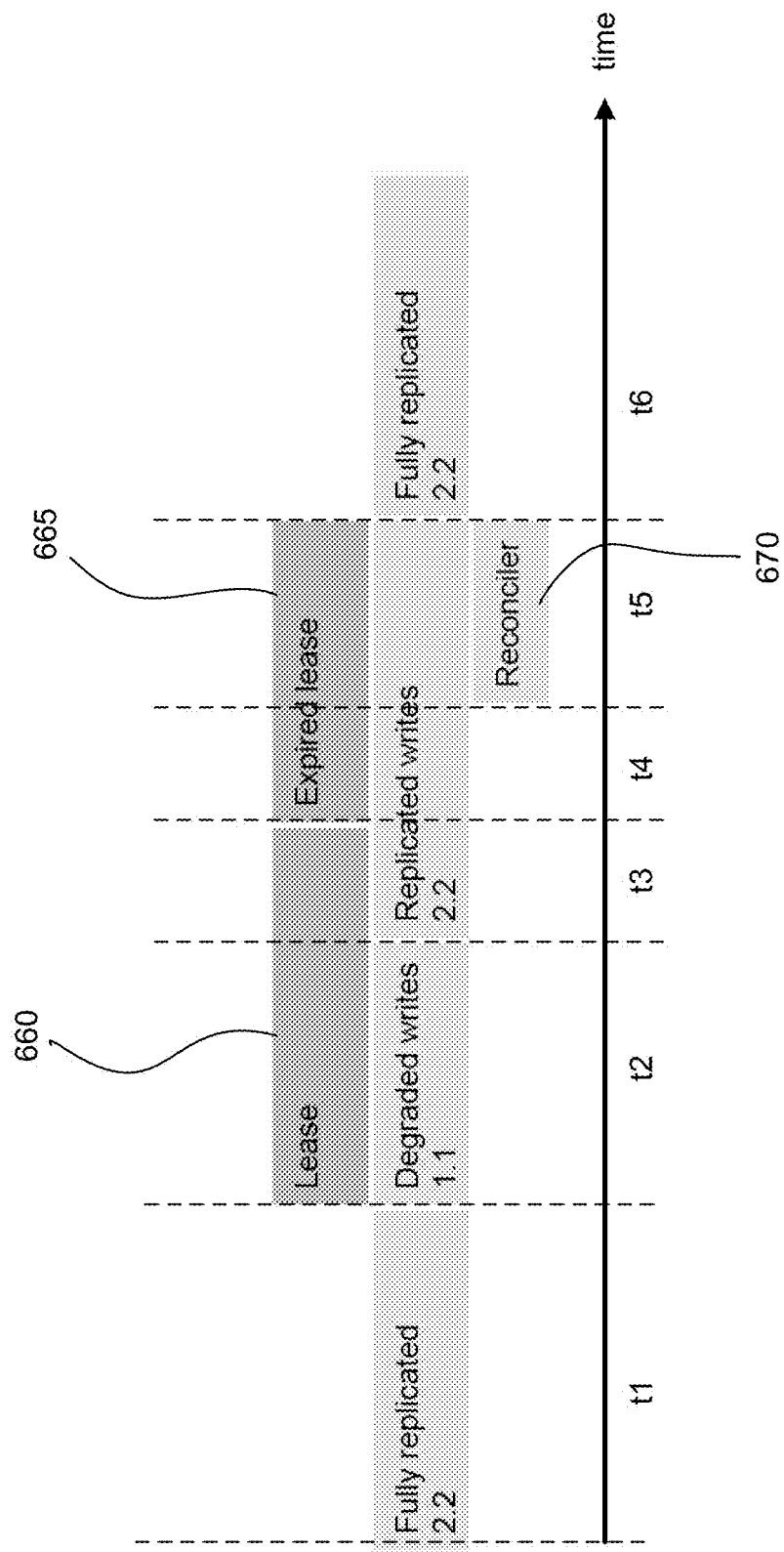
FIG. 6 illustrates an example replication lease according to aspects of the disclosure.

FIG. 6 illustrates an example replication lease. At time segment t1, the disk is in the fully replicated state, where both replicas are healthy and properly functioning. No replication lease is implemented during this state.

As time segment t2, it has been determined that one of the replicas is unhealthy. For example, an error may have resulted from an attempted a write using a probe file. Accordingly, the disk now writes in "1.1" mode. In a given mode "X.Y," X represents a number of healthy replicas that are accurately storing data, and Y represents a number of replicas of the set X that must acknowledge a successful operation. Accordingly in 1.1 mode, only one replica is accurately storing data and only the one replica must acknowledge successful completion of an operation, such as a write operation. The virtual machine attached to the disk creates replication lease 660, which indicates which replica is trusted and/or which is unhealthy. The lease may be stored where it can be persisted across virtual machine failures and also accessible to backend processors. For example, the lease may be stored in a centralized database. In other examples, the lease may be stored in the host machine, a storage device in the distributed storage system, etc.

The lease may have an associated expiration time, which may be a predetermined fixed length of time. In some examples, the length of the lease may be configured based on a severity of degradation of the unhealthy replica. For example, the length of the lease may correspond to an amount of time expected for the disk to enter the "catching up" or partially replicated state. In some examples, expiration of the replication lease indicates to one or more backend processors when it is time for reconciliation and to begin copying the data from the second replica to the first replica. For example, the lease may be allowed to expire once the disk enters the catching up/partially replicated state. The one or more backend processors may see the expired lease state, and know that the previously unhealthy replica has been restored. Accordingly, the one or more backend processors may perform a reconciliation process 670, described below. The one or more backend processors can then delete the expired replication lease when the reconciliation process is complete. In other examples, the lease may be deleted if the degraded replica cannot be restored. In further examples, if the degraded replica cannot be restored, a failover process maybe initiated where a new replica is created. In this instance, once the new replica is created, the lease may be allowed to expire. Upon seeing the expired lease, the backend processors may begin copying to the new replica.

The lease 660 may be extended by the virtual machine as needed. For example, if the lease 660 is about to expire, and the disk is still in the degraded state, the virtual machine may extend the lease for a consecutive lease period. If, on the other hand, the disk is determined to have transitioned from the degraded state to the partially replicated state, the lease 660 may be allowed to expire. For example, as shown in FIG. 6, the disk has entered the partially replicated state in time segment t3. As such, both replicas are functioning, though the previously unhealthy replica may be catching up to incorporate any writes that were missed while it was in the degraded state. Accordingly, in time segment t4, the virtual machine allows the lease 660 to expire, and the disk is associated with expired lease 665.

The lease state may be observable by the backend jobs (e.g., backend jobs 350, FIG. 3). Accordingly, for example, if the virtual machine extends the lease, it signals to the backend jobs 350 that the disk is still unhealthy. The backend jobs 350 may notice when the lease has expired. Accordingly, the backend jobs 350 may begin a reconciliation process 670, for example as shown during time segment t5.

During reconciliation 670, the backend jobs 350 begin work to restore the previously unhealthy replica. For example, the backend jobs 350 may copy data from the trusted replica to the previously unhealthy replica. When such copying is complete, the backend jobs 350 may delete the expired lease 665. The virtual machine may notice that the lease 665 is gone. This may serve as an indication that the both replicas include the same data, and thus the disk has been restored to a fully replicated state.

In some examples, markers may be used to facilitate the reconciliation process 670. For example, particular files determined to have errors may be marked as degraded. In this regard, the backend jobs can readily identify which data to copy from the trusted replica to the partially degraded or "catching up" replica after a disk has been determined to be unhealthy.

FIG. 7 illustrates an example of creating degraded file markers for unhealthy replicas. A write to a file, such as log file "1.log." in a replicated disk is attempted. The write may be issued by, for example, an attached virtual machine. The disk in this example includes a first replica in Zone A-2, which is unhealthy, and a second replica in Zone A-4, which is healthy. If the disk were fully replicated, writes to both replicas would be successful. However, because Zone A-2 is unhealthy, the virtual machine cannot write to the first replica, and thus may receive an error or failure notification.

In response to the failed write, the virtual machine closes the file 1.log to which the write was attempted. The file may be closed on both the unhealthy replica and the healthy replica, such that the disk no longer uses the file that is degraded in the unhealthy replica. The virtual machine opens a new file, such as file "2.log." on the healthy replica. The new file may be opened as a "1.1" file, where it is stored on one replica and writes to the file are acknowledged by one replica. In addition, the virtual machine opens a new degraded marker file ("degraded_marker_2.log") corresponding to the degraded 1.log file. The degraded file marker may have a file name with a predetermined format or pattern, such as including the word "degraded" or other words, numbers, or identifiers. For example, the file format may be "degraded_filename." The degraded file marker may not be used for data storage. Rather, the degraded file marker may be used to assist other jobs in scanning for data files that need to be copied. For example, when the first replica in Zone A-2 enters the partially replicated/catching up state, the backend jobs will copy data from the second replica in Zone A-4 as described above. Rather than requiring the backend jobs to scan all files of the disk, the backend jobs may search for the degraded file markers. The backend jobs can then extract data file names from the names of the degraded file markers, and use the extracted data file names to reconcile the first replica in Zone A-2 with the second replica in Zone A-4.

While the example above refers to using log files, it should be understood that degraded file markers may be created for any type of file to which an attempted write failed. Moreover, in some examples, multiple degraded file markers may be created. For example, although a write to 1.log failed, the virtual machine may continue to attempt writes to further files on both the first replica and the second replica, and thus encounter errors with respect to the first replica. Accordingly, the virtual machine may close each corrupt file and open a new file plus a corresponding degraded marker file on the healthy replica for each corrupt file on the unhealthy replica. Creation of the degraded file markers increases an efficiency of the reconciliation process by directing the backend jobs to the files that need to be copied, as opposed to copying all files or searching through files to determine which should be copied.

Once a disk goes to degraded mode, all its current files are closed on both replicas. Those closed files may be "2.2" files, because all data for the files was written to two replicas and acknowledged by two replicas. The disk opens a new set of files which are present only in a trusted replica. These new files may be "1.1" files, because their data is present only in one replica. In the partially replicated/catching up state, the disk closes all its 1.1 files and opens a new set of files in 2.2 mode. This bounds the amount of data which has to be reconciled as all data written from now on will be present in both replicas. Thus replicas will not continue diverging.

FIG. 8 illustrates an example chart 800 of the various potential states of a disk, with each row corresponding to a different disk state, and each column indicating a behavior of the disk in that state. The chart 800 summarizes the various behaviors described above. The chart 800 assumes that "2.2" replication is implemented, where data is replicated in two zones and operations are acknowledged by both replicas. However, it should be understood that alternative implementations are also possible.

In fully replicated state, shown in row 810, the disk writes in "2.2" mode. Accordingly, writes are made to and acknowledged by both replicas. No lease is associated with the disk in the fully replicated state. Because all cells or other units of data in each replica should be consistent across replicas, any cell may be trusted. For example, a virtual machine may attach to either replica, and trust that the data stored in either replica can be used without error or inconsistencies.

In the degraded state, shown in row 820, writes may be made in either 1.1 or 2.2 mode. For example, as described above, once a disk enters degraded mode, opened files are closed and reopened as 1.1 files on the trusted replica. In other examples, however, only files which actually experienced failures or slow operations may be closed and reopened as 1.1 files. This may be beneficial if files have a fairly high chance of failing independently (e.g. the underlying data is placed in different fault domains). A lease is created for the disk and is active, or not yet expired. The lease indicates which replica is trusted and/or which replica is unhealthy. Because one replica is unhealthy, only the other replica should be trusted to include accurate data.

In the catching up, or partially degraded, state shown in row 830, data is written in 2.2 mode, to both replicas. For example, as discussed above, the previously unhealthy replica may have been restored to health, but is missing data from a time during which it was unhealthy. Accordingly, such data is copied from the other, trusted replica. To avoid a need for copying additional files created in the trusted replica while the disk is in the partially degraded state, files that are created or updated while the disk is in the partially degraded state are created or updated in both replicas. While the replication lease is still associated with the disk while in the partially replicated state, the lease may be expired. Because the replica is still copying data from the trusted replica until it is fully restored, and therefore missing data, only the healthy, trusted replica should be trusted.

Figure 9:
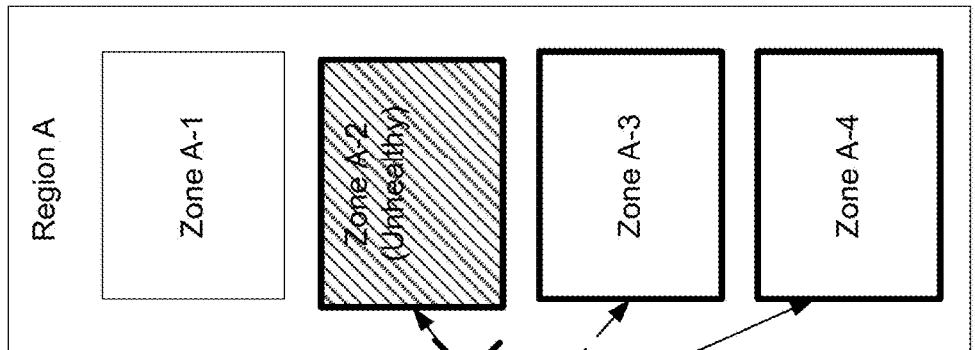
FIG. 9 is a block diagram illustrating an example failover process in accordance with aspects of the disclosure.
Figure 9:
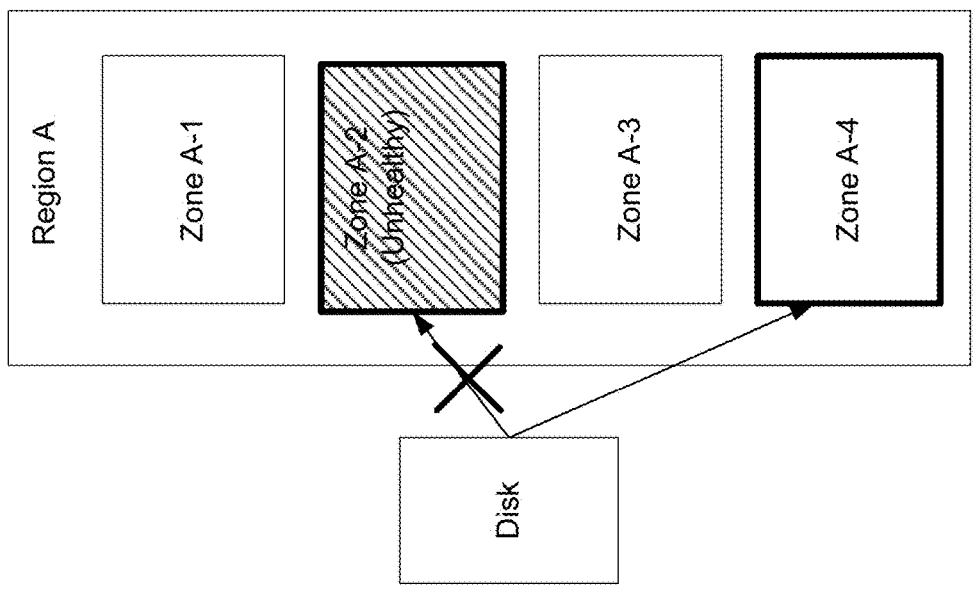

FIG. 9 illustrates an example failover scenario. For example, a whole zone (e.g., Zone A-2) may become unhealthy. Accordingly, a customer may want to attach a disk to a virtual machine in another zone (e.g., Zone A-3) to continue operation. However, if Zone A-2 is unhealthy, then it may not be possible to safely detach the disk from a virtual machine in Zone A-2. For example, corresponding control plane jobs may be partitioned away and so the control plane would not be able to communicate with the virtual machine to detach a disk from it. Moreover, it may also be unsafe to blindly attach a replicated disk to another virtual machine, such as a virtual machine in Zone A-3, as the virtual machine in the unhealthy Zone A-2 may still be running and may still be able to write to the disk. It may also be desirable to test this fail-over where a source virtual machine is actually healthy.

According to some examples, a "force-attach" operation may be performed. The force-attach operation allows the replicated disk to attach to a virtual machine even though the disk can still be accessible to another virtual machine. In order to prevent data corruption which may result from two virtual machines writing to the same disk, a double-serve prevention mechanism may be implemented. Such mechanism provides for mutual exclusion at the storage level, and can be applied for any append-only distributed file system. An application programming interface (API) may be provided to perform the force-attach of the disk, which in turn enables automatic cross-zone failover.

Double serve prevention uses storage system files as device mount files, or device locks, to prevent a virtual machine that was attached to a disk in an unhealthy zone from creating new read-write files. Initially, all mount files are marked as read-only and listed across the different zones. For example, the listing of mount files may be:

lsv1/${device_name}/mount/mount_<N.M>
lsv2/$ {device_name}/mount/mount_<N.K>

The mount files may each have two integers in their names representing different information. For example, a first integer N may incremented by each new writer to the mount file. A second integer M may be incremented whenever an existing writer needs to create a new mount file, for example, because a previous file became too big or had to be abandoned for other reasons. New mount files may be created across the different zones, in parallel where feasible. Subsequent mount files can be created in a single zone. In some example, when creating a new read-write file, something may be written to previously created mount files in parallel to make sure they have not been frozen by a new writer. A virtual machine that was attached to a disk in an unhealthy zone may be prevented from writing to already created read-write files. For example, a new writer creates its mount files with a higher version, and then freezes all existing mount files as well as all other writable files. By freezing existing mount files, the new writer prevents the virtual machine that was attached to a disk in an unhealthy zone from creating new writable files. For example, the virtual machine will fail to write to its mount files. By freezing all other writable files, the new writer prevents the virtual machine from continuing to write to already opened writable files.

After a disk is force-attached to another virtual machine in another zone, such as Zone A-3 in FIG. 9, the double-serve prevention mechanism described above may be implemented to prevent errors that would be caused if the previously attached virtual machine in Zone A-2 continued to write to the disk. Accordingly, the replicated disk may resume operation after failover. After a period of time, or once the transition to Zone A-3 has been confirmed as completed, the disk may be completely detached from the virtual machine in Zone A-2.

Figure 10:
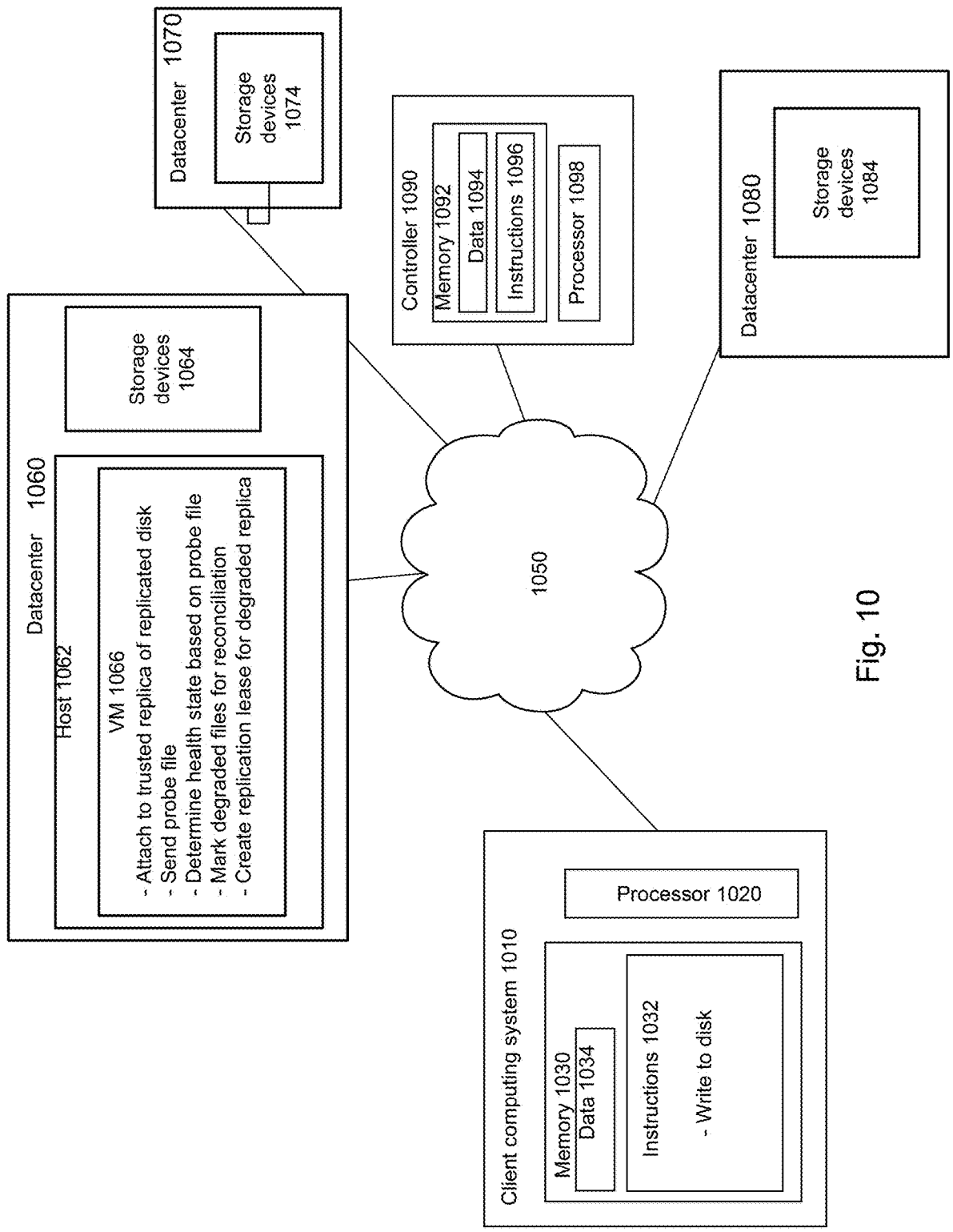
FIG. 10 is a block diagram of an example system according to aspects of the disclosure.

FIG. 10 illustrates an example system including a distributed computing environment. A plurality of datacenters 1060, 1070, 1080 may be communicatively coupled, for example, over a network 1050. The datacenters 1060, 1070, 1080 may further communicate with one or more client devices, such as client 1010, over the network 1050. In some examples, the datacenters 1060, 1070, 1080 may further communicate with a controller 1090.

The datacenters 1060-1080 may be positioned a considerable distance from one another. For example, the datacenters may be positioned in various countries around the world. Each datacenter 1060, 1070, 1080 may include one or more computing devices, such as processors, servers, shards, or the like. For example, as shown in FIG. 10, datacenter 1060 includes host computing device 1062 and a plurality of storage devices 1064, datacenter 1070 includes storage devices 1074, and datacenter 1080 includes storage devices 1084. While hosts or other processing devices are not shown in datacenters 1070, 1080 it should be understood that they may also be included. According to some examples, the computing devices may include one or more virtual machines running on a host machine. For example, computing device 1062 may be a host machine, supporting one or more virtual machines 1066 running an operating system and applications. While only one virtual machine 1066 is illustrated in FIG. 10, it should be understood that any number of virtual machines may be supported by any number of host computing devices. Moreover, it should be understood that the configuration illustrated in FIG. 10 is merely an example, and that the computing devices in each of the example datacenters 1060-1080 may have various structures and components that may be the same or different from one another.

Programs may be executed across these computing devices, for example, such that some operations are executed by one or more computing devices of a first datacenter while other operations are performed by one or more computing devices of a second datacenter. In some examples, the computing devices in the various datacenters may have different capacities. For example, the different computing devices may have different processing speeds, workloads, etc. While only a few of these computing devices are shown, it should be understood that each datacenter 1060, 1070, 1080 may include any number of computing devices, and that the number of computing devices in a first datacenter may differ from a number of computing devices in a second datacenter. Moreover, it should be understood that the number of computing devices in each datacenter 1060-1080 may vary over time, for example, as hardware is removed, replaced, upgraded, or expanded.

The storage devices 1064, 1074, 1084 may include hard drives, random access memory, disks, disk arrays, tape drives, or any other types of storage devices. The datacenters 1060-1080 may implement any of a number of architectures and technologies, including, but not limited to, direct attached storage (DAS), network attached storage (NAS), storage area networks (SANs), fibre channel (FC), fibre channel over Ethernet (FCOE), mixed architecture networks, or the like. The datacenters 1060-1080 may include a number of other devices in addition to the storage devices, such as cabling, routers, etc. Further, in some examples the datacenters 1060-1080 may be virtualized environments. Further, while only a few datacenters 1060-1080 are shown, numerous datacenters may be coupled over the network 1050 and/or additional networks.

The storage devices 1064, 1074, 1084 may include data corresponding to a replicated disk. For example, a disk may be replicated in a first replica in a first storage device in datacenter 1060, and also in a second replica in a second storage device in datacenter 1080. According to other examples, the disk may be replicated across multiple different storage devices within the same datacenter. The number of storage devices across which the disk is replicated may be varied. For example, while in the present example the disk is replicated across two storage devices, according to other examples additional replicas may be implemented.

The virtual machine 1066 may attach to one or more replicas of a disk. For example, the VM 1066 may attach to a trusted replica. The VM 1066 may determine a health state of the disk, for example, by sending a probe file to one or more of the replicas as discussed above in connection with FIG. 5. When files of a replica are determined to be degraded, the VM 1066 may mark such files, such as by using degraded file markers as discussed above in connection with FIG. 7. Moreover, the VM 1066 may create a replication lease for the degraded disk, such as discussed above in connection with FIG. 6.

In some examples, the controller 1090 may communicate with the computing devices in the datacenters 1060-1080, and may facilitate the execution of programs. For example, the controller 1090 may track the capacity, status, workload, or other information of each computing device, and use such information to assign tasks. The controller 1090 may include a processor 1098 and memory 1092, including data 1094 and instructions 1096, similar to the client 1010 described above.

Each client 1010 may be a personal computer, intended for use by a person having all the internal components normally found in a personal computer such as a central processing unit (CPU), CD-ROM, hard drive, and a display device, for example, a monitor having a screen, a projector, a touch-screen, a small LCD screen, a television, or another device such as an electrical device that can be operable to display information processed by processor 1020, speakers, a modem and/or network interface device, user input, such as a mouse, keyboard, touch screen or microphone, and all of the components used for connecting these elements to one another. Moreover, computers in accordance with the systems and methods described herein may include devices capable of processing instructions and transmitting data to and from humans and other computers including general purpose computers, PDAs, tablets, mobile phones, smartwatches, network computers lacking local storage capability, set top boxes for televisions, and other networked devices.

The client 1010 may contain a processor 1020, memory 1030, and other components typically present in general purpose computers. The memory 1030 can store information accessible by the processor 1020, including instructions 1032 that can be executed by the processor 1020. Memory can also include data 1034 that can be retrieved, manipulated or stored by the processor 1020. The memory 1030 may be a type of non-transitory computer readable medium capable of storing information accessible by the processor 1020, such as a hard-drive, solid state drive, tape drive, optical storage, memory card, ROM, RAM, DVD, CD-ROM, write-capable, and read-only memories. The processor 1020 can be a well-known processor or other lesser-known types of processors. Alternatively, the processor 1020 can be a dedicated controller such as an ASIC.

The instructions 1032 can be a set of instructions executed directly, such as machine code, or indirectly, such as scripts, by the processor 1020. In this regard, the terms "instructions," "steps" and "programs" can be used interchangeably herein. The instructions 1032 can be stored in object code format for direct processing by the processor 1020, or other types of computer language including scripts or collections of independent source code modules that are interpreted on demand or compiled in advance.

The data 1034 can be retrieved, stored or modified by the processor 1020 in accordance with the instructions 1032. For instance, although the system and method is not limited by a particular data structure, the data 1034 can be stored in computer registers, in a relational database as a table having a plurality of different fields and records, or XML documents. The data 1034 can also be formatted in a computer-readable format such as, but not limited to, binary values, ASCII or Unicode. Moreover, the data 1034 can include information sufficient to identify relevant information, such as numbers, descriptive text, proprietary codes, pointers, references to data stored in other memories, including other network locations, or information that is used by a function to calculate relevant data.

Although FIG. 10 functionally illustrates the processor 1020 and memory 1030 as being within the same block, the processor 1020 and memory 1030 may actually include multiple processors and memories that may or may not be stored within the same physical housing. For example, some of the instructions 1032 and data 1034 can be stored on a removable CD-ROM and others within a read-only computer chip. Some or all of the instructions and data can be stored in a location physically remote from, yet still accessible by, the processor 1020. Similarly, the processor 1020 can actually include a collection of processors, which may or may not operate in parallel.

Client 1010, datacenters 1060-1080, and control 1090 can be capable of direct and indirect communication such as over network 150. For example, using an Internet socket, a client 1010 can connect to a service operating on remote servers through an Internet protocol suite. Servers can set up listening sockets that may accept an initiating connection for sending and receiving information. The network 1050, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71$b$, $g$, $n$, or other such standards), and HTTP, and various combinations of the foregoing. Such communication may be facilitated by a device capable of transmitting data to and from other computers, such as modems (e.g., dial-up, cable or fiber optic) and wireless interfaces.

Client 1010 may issue a command to write data to the replicated disk. If the disk is in fully replicated mode, the data will be written to both replicas. However, if the disk is degraded, the data may be written to the trusted replica and later copied to the other replica after it has recovered. In either case, the command may appear to the client 1010 as having been successfully completed.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 11:
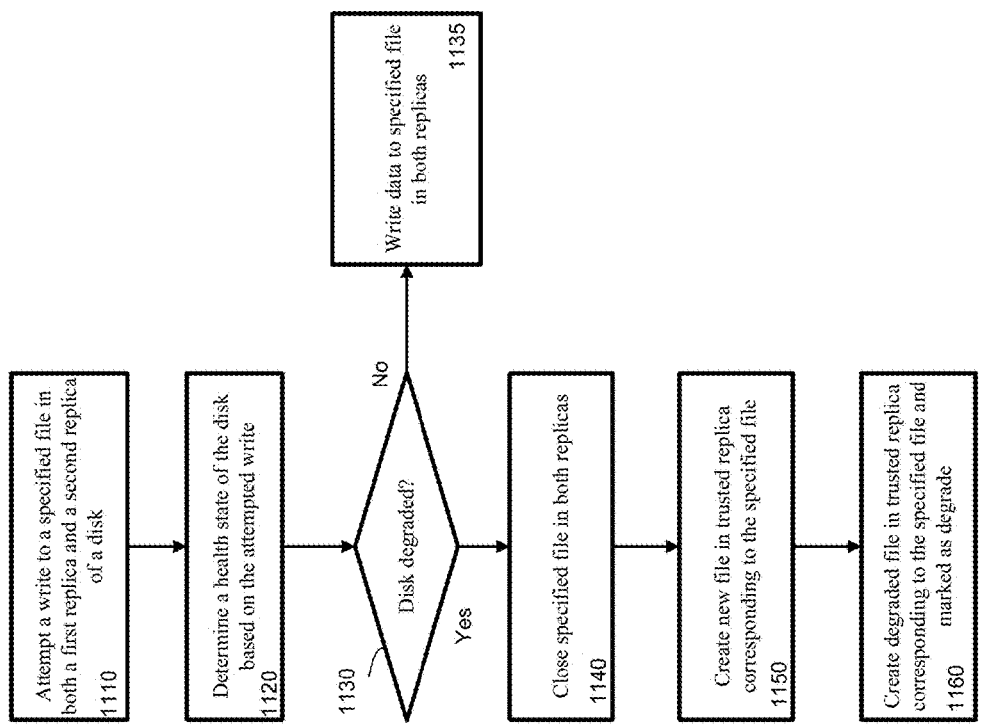
FIG. 11 is a flow diagram illustrating an example method according to aspects of the disclosure.

FIG. 11 illustrates an example method 1100 of maintaining a replicated disk in a distributed block storage system. The method 1100 may be performed by, for example, a virtual machine attached to the replicated disk. In other examples, however, the method 110 may be performed by one or more other processing devices.

In block 1110, a write is attempted to a specific file in both a first replica and a second replica of the disk. The write may be a result of a client command, or it may be directed to a probe file generated for a purpose of determining a health state of the disk. Where the write command is directed to a probe file, it may include dummy data written to a log file or another file that would not interfere with the data stored by the disk.

In block 1120, a health state of the disk is determined based on a result of the attempted write. Various possible health states of the disk include fully replicated, in which both replicas are properly functioning and storing data, degraded, in which one replica is unhealthy, or partially replicated, in which the unhealthy replica is restored to health, but is still missing data. The missing data may be, for example, data that was written to the trusted replica when the other replica was unhealthy.

If in block 1130 the disk is not degraded, the attempted write was successful in both replicas (block 1135). Accordingly, the disk may be determined to be healthy and in fully replicated state. If, however, the attempted write to one of the replicas failed, the disk may be determined to be in degraded mode, in which case the method 1100 proceeds to block 1140.

In block 1140, the specified file to which the write attempt was made is closed in both replicas. In block 1150, a new file is created in the trusted replica, the new file corresponding to the specified file. In block 1160, a degraded file is also created in the trusted replica. The degraded file is marked as degraded, such as in the file name, and also corresponds to the specified file. The degraded file is visible to backend jobs, which may scan for the degraded file to facilitate reconciliation of the unhealthy replica with the trusted replica. For example, once the unhealthy replica is restored to health, the backend jobs may copy data from the trusted replica to the restored replica to make it complete. Rather than searching for all missing data, the backend jobs may scan file names for degraded files, extract names of corresponding files to be copied, and copy those files.

The examples described above provide a number of advantages. For example, replication in the block storage system may be performed efficiently, using a minimum number of machines to replicate data for a disk. Moreover, determination of the health state using attempted writes provides flexibility of relying on attempted command from client device, or independently checking a health state of the disk using probe files. By creating a lease period for replicas determined to be unhealthy, backend jobs can interface with the virtual machine to help restore the disk to a fully replicated mode. Accordingly, operations are offloaded from the virtual machine and onto backend jobs, thus freeing up resources for the virtual machine. Further efficiency is provided by creation of the degraded file markers, which enable the backend jobs to readily identify which data should be copied from the trusted replica to restore the disk to fully replicated mode.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for maintaining a replicated disk in a distributed storage system, comprising:
    maintaining, in one or more memories in a first zone of the distributed storage system, a first replica including a first copy of disk data including a plurality of files;
    maintaining, in the one or more memories in a second zone of the distributed storage system, a second replica including a second copy of the disk data including the plurality of files;
    determining that one or more given files of the first replica are corrupt; and
    creating, in the second replica, one or more degraded file markers corresponding to the one or more given files;
    scanning, by one or more backend processors, the data in the second replica for files marked as degraded;

extracting data file names from names of the degraded file marker; and reconciling the first replica with the second replica using the extracted data file names, the reconciling comprising copying data from the second replica to the first replica.

2. The method of claim 1, further comprising closing the one or more given files in both the first replica and the second replica, and creating a new file corresponding to each of the one or more given files in the second replica.

3. The method of claim 1, wherein the degraded file marker comprises a file name including an indicator that the one or more given files is degraded.

4. The method of claim 1, further comprising directing backend processors to files that need to be copied to reconcile the first replica with the second replica.

5. The method of claim 1, further comprising:
attaching the replicated disk to a second virtual machine while the replicated disk is accessible to a first virtual machine; and
preventing the first virtual machine from creating new read-write files.

6. The method of claim 1, wherein a health state of the disk is variable between a fully replicated state, a degraded state, and a partially replicated state,
wherein in the fully replicated state both replicas are healthy;
wherein in the degraded state the first replica is unhealthy and the second replica is trusted; and
wherein in the partially replicated state, the first replica has been restored to health from the degraded state, but is missing data as compared to the second replica.

7. The method of claim 6, further comprising creating a replication lease for the degraded state, wherein the replication lease is allowed to expire once the disk enters the partially replicated state.

8. The method of claim 7, wherein expiration of the replication lease indicates to one or more backend processors to begin copying the data from the second replica to the first replica, and wherein the one or more backend processors delete the expired replication lease when copying is complete.

9. The method of claim 7, wherein the replication lease further indicates which replica is degraded and which replica is trusted.

10. A system for maintaining a replicated disk in a distributed storage system, comprising:
one or more memories in a first zone of the distributed storage system, the one or more memories in the first zone storing a first replica including a first copy of disk data including a plurality of files;
one or more memories in a second zone of the distributed storage system, the one or more memories in the first zone storing a second replica including a second copy of the disk data including the plurality of files;
one or more processors in communication with at least one of the first replica or the second replica, the one or more processors configured to:
determine that one or more given files of the first replica are corrupt; and
create, in the second replica, one or more degraded file markers corresponding to the one or more given files;
scan the data in the second replica for files marked as degraded;

extract data file names from names of the degraded file marker; and
reconcile the first replica with the second replica using the extracted data file names, the reconciling comprising copying data from the second replica to the first replica.

11. The system of claim 10, wherein the one or more processors are further configured to close the one or more given files in both the first replica and the second replica, and creating a new file corresponding to each of the one or more given files in the second replica.

12. The system of claim 10, wherein the degraded file marker comprises a file name including an indicator that the one or more given files is degraded.

13. The system of claim 10, wherein the one or more processors are further configured to direct backend processors to files that need to be copied to reconcile the first replica with the second replica.

14. The system of claim 10, wherein a health state of the disk is variable between a fully replicated state, a degraded state, and a partially replicated state,
wherein in the fully replicated state both replicas are healthy;
wherein in the degraded state the first replica is unhealthy and the second replica is trusted; and
wherein in the partially replicated state, the first replica has been restored to health from the degraded state, but is missing data as compared to the second replica.

15. The system of claim 14, wherein the one or more processors are further configured to create a replication lease for the degraded state, wherein the replication lease is allowed to expire once the disk enters the partially replicated state.

16. The system of claim 15, wherein expiration of the replication lease indicates to one or more backend processors to begin copying the data from the second replica to the first replica, and wherein the one or more backend processors delete the expired replication lease when copying is complete.

17. The system of claim 15, wherein the replication lease further indicates which replica is degraded and which replica is trusted.

18. A non-transitory computer-readable medium storing instructions executable by one or more processor for performing a method of maintaining a replicated disk in a distributed storage system, the method comprising:
maintaining a first replica including a first copy of disk data including a plurality of files;
maintaining a second replica including a second copy of the disk data including the plurality of files;
determining that one or more given files of the first replica are corrupt; and
creating, in the second replica, one or more degraded file markers corresponding to the one or more given files;
scanning, by one or more backend processors, the data in the second replica for files marked as degraded;
extracting data file names from names of the degraded file marker; and
reconciling the first replica with the second replica using the extracted data file names, the reconciling comprising copying data from the second replica to the first replica.

* * * * *